United States Patent
Kim et al.

(10) Patent No.: US 9,368,010 B2
(45) Date of Patent: Jun. 14, 2016

(54) SECURITY PRINTING PAPER BASED ON CHIPLESS RADIO FREQUENCY TAG AND METHOD OF MANUFACTURING THE SAME

(71) Applicant: ELECTRONICS AND TELECOMMUNICATIONS RESEARCH INSTITUTE, Daejeon (KR)

(72) Inventors: Min sik Kim, Daejeon (KR); Seung jin Ryu, Daejeon (KR); Han jun Yoon, Daejeon (KR); Do hoon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 5 days.

(21) Appl. No.: 14/457,509

(22) Filed: Aug. 12, 2014

(65) Prior Publication Data
US 2016/0005283 A1    Jan. 7, 2016

(30) Foreign Application Priority Data
Jul. 7, 2014    (KR) .................. 10-2014-0084605

(51) Int. Cl.
*G08B 13/14*    (2006.01)
*G08B 13/24*    (2006.01)
*B32B 29/00*    (2006.01)
*D21H 21/48*    (2006.01)

(52) U.S. Cl.
CPC .......... *G08B 13/2431* (2013.01); *B32B 29/005* (2013.01); *D21H 21/48* (2013.01); *G08B 13/2434* (2013.01); *B32B 2519/02* (2013.01)

(58) Field of Classification Search
CPC ..... B41M 3/14; G08K 19/07758; G06F 21/00
USPC ................... 340/572.1–572.9, 10.1; 358/1.14
See application file for complete search history.

(56) References Cited

U.S. PATENT DOCUMENTS

| | | | |
|---|---|---|---|
| 5,161,829 A | 11/1992 | Detrick et al. | |
| 2002/0170973 A1* | 11/2002 | Teraura .................. | B41J 11/009 235/492 |
| 2006/0181716 A1* | 8/2006 | Hoshina ........... | G06K 19/07749 358/1.1 |
| 2007/0278315 A1 | 12/2007 | Michalk | |
| 2008/0273701 A1 | 11/2008 | Perori et al. | |
| 2010/0073142 A1* | 3/2010 | Kim .................... | G06K 19/0675 340/10.4 |
| 2010/0167082 A1* | 7/2010 | Oh ......................... | D21H 19/02 428/608 |
| 2011/0215563 A1 | 9/2011 | Rancien et al. | |
| 2012/0067962 A1* | 3/2012 | McDonald .............. | G09B 29/04 235/492 |

(Continued)

FOREIGN PATENT DOCUMENTS

| | | |
|---|---|---|
| EP | 0 794 520 A1 | 9/1997 |
| EP | 1 079 397 A1 | 2/2001 |

(Continued)

*Primary Examiner* — Phung Nguyen
(74) *Attorney, Agent, or Firm* — LRK Patent Law Firm

(57) ABSTRACT

Security printing paper based on a chipless radio frequency (RF) tag and a method of manufacturing the same are provided. The security printing paper based on a chipless RF tag includes first base paper, second base paper, and one or more chipless RF tags. The chipless RF tags are disposed between the first base paper and the second base paper. At least one layer configured to prevent the locations of the chipless RF tags from being exposed to the outside and to enable the security printing paper to be detected is formed on one or more of the first base paper and the second base paper.

10 Claims, 4 Drawing Sheets

(56) References Cited

U.S. PATENT DOCUMENTS

2012/0206242 A1 8/2012 Cho
2013/0264814 A1 10/2013 Choi et al.

FOREIGN PATENT DOCUMENTS

| | | |
|---|---|---|
| EP | 1 357 226 A2 | 10/2003 |
| JP | 2010-529317 A | 8/2010 |
| KR | 10-2008-0107977 A | 12/2008 |
| KR | 10-2011-0052976 A | 5/2011 |
| KR | 10-1048164 B1 | 7/2011 |
| KR | 10-2014-0038828 A | 3/2014 |
| WO | 2007/131383 A1 | 11/2007 |
| WO | 2008/150133 A2 | 12/2008 |
| WO | 2009/151607 A1 | 12/2009 |

* cited by examiner

SECURITY PRINTING PAPER BASED ON CHIPLESS RADIO FREQUENCY TAG AND METHOD OF MANUFACTURING THE SAME

CROSS-REFERENCE TO RELATED APPLICATION

This application claims the benefit of Korean Patent Application No. 10-2014-0084605, filed Jul. 7, 2014, which is hereby incorporated by reference herein in its entirety.

BACKGROUND

1. Technical Field

The present disclosure relates generally to security printing paper based on a chipless radio frequency (RF) tag and a method of manufacturing the same and, more particularly, to security printing paper based on a chipless RF tag, in which a chipless RF tag is inserted into printing paper, thereby preventing the illegal exit of the printing paper at an RF tag-based detection gate, and a method of manufacturing the same.

2. Description of the Related Art

With the development of technology, the number of cases of the leakage of state-of-the-art industrial technology is continuously growing. The leakage of state-of-the-art industrial technology is mainly committed by an insider who intelligently exploits a loophole in an existing security system. Accordingly, technology for preventing the leakage of output confidential documents and diagrams, etc. is required.

In order to prevent the leakage of outputs, Korean Patent Application Publication No. 2008-0107977 discloses a technology that enables an output, which is output as printing paper, to be detected when the output passes through a paper detection gate by inserting a magnetic material detection tag into the printing paper.

The technology of Korean Patent Application Publication No. 2008-0107977 is applied to an electromagnetic (EM) method in which a change in magnetic field occurs when a detection tag made of soft magnetic metallic material passes through an alternating current (AC) magnetic field generated by a detection means, such as a detection gate, and then the presence of the detection tag is detected based on the change in magnetic field.

This EM method has a limitation in terms of popularization because the detection gate and the magnetic material are expensive.

SUMMARY

Accordingly, at least one embodiment of the present invention is intended to provide security printing paper based on a chipless RF tag, which is capable of enhancing cost competitiveness, ensuring a high detection rate, and enabling the illegal exit of important printing paper including confidential information, etc. to be detected, and a method of manufacturing the same.

In accordance with an aspect of the present invention, there is provided security printing paper based on a chipless RF tag, including first base paper; second base paper; and one or more chipless RF tags disposed between the first base paper and the second base paper; wherein at least one layer configured to prevent locations of the chipless RF tags from being exposed to an outside and to enable the security printing paper to be detected is formed on one or more of the first base paper and the second base paper.

The layer may be formed on any one of the inner and outer surfaces of the first base paper, the layer being formed between the inner surface of the first base paper and the chipless RF tags or on the outer surface of the first base paper.

The layer may be formed on any one of the inner and outer surfaces of the second base paper, the layer being formed between the inner surface of the second base paper and the chipless RF tags or on the outer surface of the second base paper.

The layer may be formed on any one of the inner and outer surfaces of the first base paper and any one of the inner and outer surfaces of the second base paper.

The layer may be formed to have a predetermined pattern or color.

When the chipless RF tags are disposed in two or more sheets of security printing paper, the chipless RF tags may be disposed not to overlap each other even when the two or more sheets of security printing paper are superimposed on each other.

The chipless RF tags may include an ID value configured to enable whether the exit of the security printing paper has been permitted to be determined.

In accordance with another aspect of the present invention, there is provided a method of manufacturing security printing paper based on a chipless RF tag including preparing first base paper and second base paper; forming at least one layer, configured to prevent the locations of one or more chipless RF tags from being exposed to an outside and to enable the security printing paper to be detected, on one or more of the first base paper and the second base paper; disposing the chipless RF tags on the inner surface of the first base paper or the inner surface of the second base paper; and combining the first base paper and the second base paper by bonding the first base paper and the second base paper to each other.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
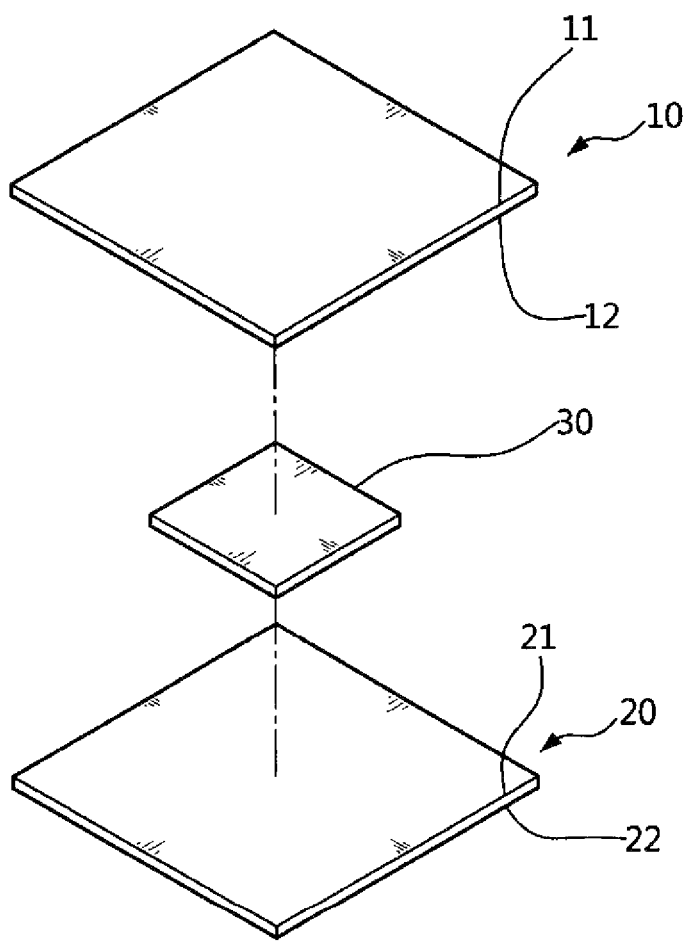
FIG. 1 is an exploded perspective view of security printing paper based on a chipless RF tag according to an embodiment of the present invention.

The present invention may be subjected to various modifications, and may have various embodiments. Specific embodiments are illustrated in the accompanying drawings and described in detail.

However, this is not intended to limit the present invention to the specific embodiments. Rather, it should be appreciated that all modifications, equivalents and replacements included in the spirit and technical range of the present invention fall within the range of the present invention.

The terms used herein are used merely to illustrate specific embodiments, and are not intended to limit the present invention. Unless otherwise stated clearly, a singular expression includes a plural expression. In the specification and claims, it should be understood that the term "comprise," "include," "have" and their variants are intended merely to designate the presence of features, numbers, steps, operations, elements, parts or combinations thereof described in the specification, and should not be construed as excluding the presence or additional probability of one or more different features, numbers, steps, operations, elements, parts or combinations thereof.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having meanings that are consistent with their meanings in the context of the relevant art and will not be interpreted in an idealized or overly formal sense unless expressly so defined herein.

Embodiments of the present invention are described in detail below with reference to the accompanying drawings. In the following description of the embodiments, the same reference numerals are assigned to the same elements throughout the drawings and also redundant descriptions of the same elements are omitted, in order to facilitate the overall understanding of the embodiments.

Figure 2:
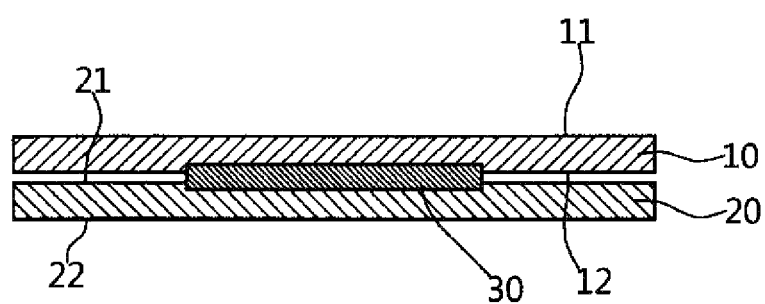
FIG. 2 is a sectional view of the security printing paper based on a chipless RF tag according to the embodiment of the present invention.
Figure 3:
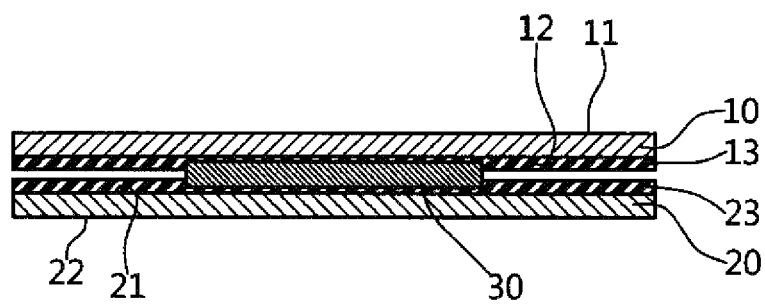
FIG. 3 is a sectional view of the case where a specific pattern or color is applied to the security printing paper based on a chipless RF tag according to the embodiment of the present invention.

FIG. 1 is an exploded perspective view of security printing paper based on a chipless RF tag according to an embodiment of the present invention, FIG. 2 is a sectional view of the security printing paper based on a chipless RF tag according to the embodiment of the present invention, and FIG. 3 is a sectional view of the case where a specific pattern or color is applied to the security printing paper based on a chipless RF tag according to the embodiment of the present invention.

The security printing paper based on a chipless RF tag according to the embodiment of the present invention includes first base paper 10, second base paper 20, and one or more chipless RF tags 30.

The first base paper 10 and the second base paper 20 have the same composition as common printing paper.

The one and more chipless RF tags 30 are provided between the first base paper 10 and the second base paper 20.

The chipless RF tags 30 may be manufactured by a flexible substrate and device technology using polymer conductive ink, a plastic semiconductor, etc. instead of an existing silicon semiconductor. Meanwhile, the chipless RF tags 30 may be manufactured by a method of including very thin metal fiber in paper or plastic, thereby allowing the transmission and scattering of radio waves and thus enabling unique identification.

The chipless RF tags 30 may be disposed at any locations of a surface where the first base paper 10 and the second base paper 20 are bonded to each other. However, when a plurality of chipless RF tags 30 is disposed, the plurality of chipless RF tags 30 may be disposed not to come into contact with each other.

Meanwhile, if security printing paper in which chipless RF tags 30 are provided between a sheet of first base paper 10 and a sheet of second base paper 20 is referred to as a single sheet of security printing paper, the number, size and locations of the chipless RF tags 30 provided in the single sheet of security printing paper may be set to an optimum number, an optimum size and optimum locations that may enhance the probability of detection and reduce manufacturing costs. In this case, the optimum number may be one or more. The optimum locations may be locations where the chipless RF tags 30 do not come into contact with each other. The optimum size will depend on a technology that may be used to manufacture the chipless RF tags 30.

The above-described embodiment of the present invention will be described in more detail with reference to FIG. 2. The chipless RF tags 30 are attached to the inner surface 12 of the first base paper 10 or the inner surface 21 of the second base paper 20. In this case, the chipless RF tags 30 may be drawn using conductive ink or the like.

After the chipless RF tags 30 have been attached, the inner surface 12 of the first base paper 10 and the inner surface 21 of the second base paper 20 are bonded to each other by an adhesive means.

Meanwhile, the locations of the chipless RF tags 30 provided inside the security printing paper may be exposed to the outside by the action of illuminating the printing paper with light In order to prevent this problem, a processing method of increasing the opacity of the printing paper, thereby preventing the locations of the chipless RF tags 30, provided inside the printing paper, from being exposed to the outside, may be applied to the embodiment of the present invention. For example, in order to prevent the locations of the chipless RF tags 30 from being exposed to the outside, the inner and/or outer surfaces of the first base paper 10 and/or the second base paper 20 may be carbon-coated, and a specific pattern or color may be applied to the outer surface 11 or inner surface 12 of the first base paper 10 or the outer surface 22 or inner surface 21 of the second base paper 20.

If necessary, a specific pattern or color may be applied to the inner or outer surfaces of the first base paper 10 and the second base paper 20. In this case, the specific pattern or color may have a color almost similar to that (for example, opaque silver or gray) of the chipless RF tags 30 or a color darker than that of the chipless RF tags 30. Further, the specific pattern or color is used not only to prevent the exposure of the locations of the chipless RF tags 30 but also to function as a mark that enables whether paper currently used is security printing paper to be detected via a detecting means.

As described above, since the specific pattern or color is applied, one or more thin layers are formed on the first base paper 10 and/or the second base paper 20. For example, as illustrated in FIG. 3, a layer 13 to which the specific pattern or color has been applied may be formed on the inner surface 12 of the first base paper 10, or a layer 23 to which the specific pattern or color has been applied may be formed on the inner surface 21 of the second base paper 20. Of course, if the inner or outer surfaces of the first base paper 10 and the second base paper 20 are carbon-coated, carbon coating layers are formed.

The layers 13 and 23 are formed on the inner surfaces of the first base paper 10 and the second base paper 20, respectively, as illustrated in FIG. 3. However, a layer may be formed only on the inner surface of any one of the first base paper 10 and the second base paper 20, if necessary. Alternatively, layers to which the specific pattern or color has been applied may be formed on the outer surfaces 11 and 21 of the first base paper 10 and the second base paper 20, or a layer to which the specific pattern or color has been applied may be formed only on the outer surface of any one of the first base paper 10 and the second base paper 20.

Although a gap is illustrated as being present between the first base paper 10 and the second base paper 20 in FIGS. 2 and 3, this is intended to enable the inner and outer surfaces of the first base paper 10 and the second base paper 20 to be easily distinguished from each other. In practice, the first base paper 10 and the second base paper 20 are bonded to each other by an adhesive, and thus there is no gap therebeween.

Figure 4:
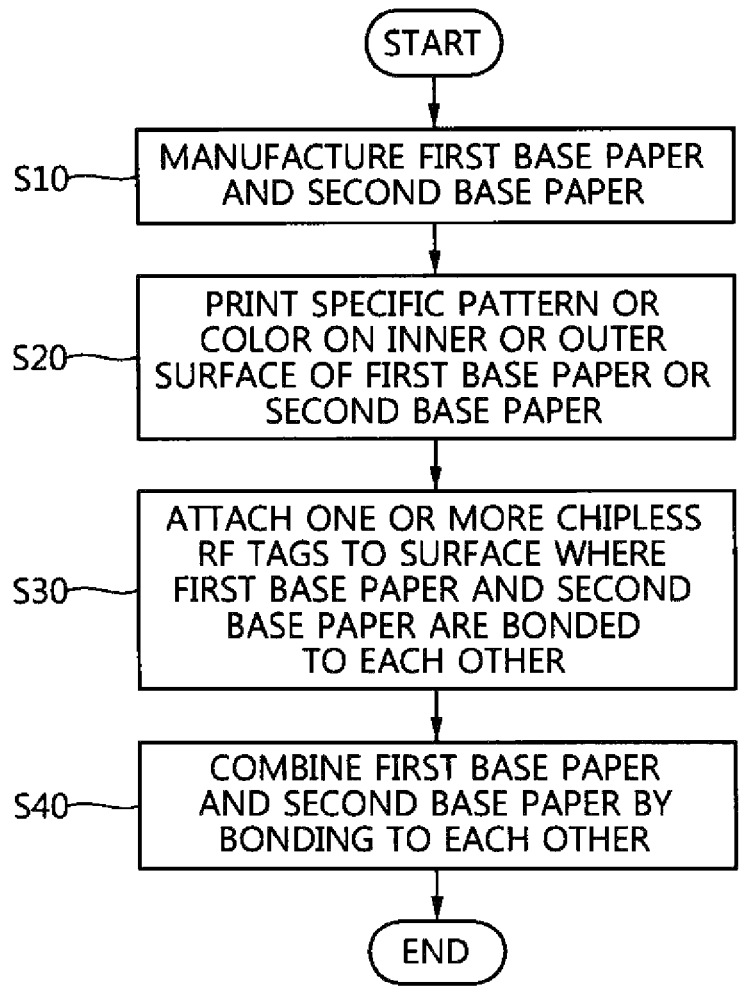
FIG. 4 is a flowchart illustrating a method of manufacturing security printing paper based on a chipless RF tag according to an embodiment of the present invention.

FIG. 4 is a flowchart illustrating a method of manufacturing security printing paper based on a chipless RF tag according to an embodiment of the present invention. The following description may be understood as a description of the operation of an apparatus for manufacturing security printing paper.

At step S10, the first base paper 10 and the second base paper 20 are manufactured. Of course, the first base paper 10 and the second base paper 20 that have been manufactured in advance may be prepared. In this case, a method of manufacturing the first base paper 10 and the second base paper 20 is not described in detail, but may be fully understood by those skilled in the art because it corresponds to a well-known technology.

Thereafter, at step S20, the inner and/or outer surfaces of the first base paper 10 and/or the second base paper 20 are carbon-coated, or a specific pattern (for example, a pattern identical to or different from that of an RF antenna) or a specific color (for example, a color almost similar to or darker than that of the chipless RF tags 30) is applied to the inner or outer surface of the manufactured first base paper 10 or second base paper 20 in order to prevent the locations of the chipless RF tags 30, provided inside the security printing paper, from being exposure to the outside and to enable the security printing paper to be detected. Accordingly, the layer 13 or 23 is formed (printed) on the inner or outer surface of the first base paper 10 or the second base paper 20.

Therefore, the opacity of the security printing paper is increased, and thus the locations of the chipless RF tags 30 may be not identified even when the printing paper is illuminated with light, thereby preventing the tags from being intentionally damaged.

At step S30, the one or more chipless RF tags 30 are attached to a surface where the first base paper 10 and the second base paper 20 are bonded to each other. In this case, when two or more sheets of security printing paper are superimposed on each other, the situation in which detection is not achieved due to the overlap of the locations of the chipless RF tags 30 may occur. In order to prevent such a situation, the suitable locations of the chipless RF tags 30 are to be considered when the chipless RF tags 30 are attached at step S30. That is, at step S30, the chipless RF tags 30 are disposed not to overlap each other when a plurality of sheets of security printing paper is superimposed on each other.

Although in the above description, the layers 13 and 23 are formed on the inner or outer surfaces of the first base paper 10 and the second base paper 20 and then the chipless RF tags 30 are attached to the surfaces for the convenience of a manufacturing process, the chipless RF tags 30 may be attached and then the layers 13 and 23 are formed on the inner or outer surfaces of the first base paper 10 and the second base paper 20, if necessary.

Finally, at step S40, the first base paper 10 and the second base paper 20 are combined by bonding them to each other. In this case, a common adhesive is used to combine the first base paper 10 and the second base paper 20.

Accordingly, since the chipless RF tags 30 do not protrude through the surface of the printing paper, a machine is not damaged even when the security printing paper is used as printing paper for a printing device.

Although not disclosed in the above-described embodiments, an ID value (for example, export permit information is contained) or the like may be contained in the chipless RF tags 30 in order to add a function, such as a function of determining whether the exit of the security printing paper has been permitted.

Meanwhile, by applying an RF tag including a chip instead of the chipless RF tag, it may be made possible to perform a function of enabling whether the legal exit of the printing paper is possible to be determined using information inserted into a chip, in addition to the function of preventing the illegal exit of the printing paper.

Meanwhile, by applying an RF tag including a chip instead of the chipless RF tag, it may be made possible to enable whether the security printing paper is inserted in a printer to be determined using information inserted into the chip.

In accordance with an embodiment of the present invention having the above-described configuration, price competitiveness can be achieved and thus the security paper can be popularized to small and medium-sized businesses, etc., a high detection rate can be ensured, and the illegal exit of important printing paper including confidential information, etc. can be detected.

Furthermore, since the chipless RF tags do not protrude through the surface of the printing paper, a machine is not damaged even when the security printing paper is used as printing paper for a printing device, such as a printer.

Furthermore, processing is performed such that the chipless RF tags are inserted between two sheets of base paper and also the locations of the tags are not exposed to the outside, thereby preventing the tags from being intentionally damaged and thus preventing the illegal exit of the security printing paper.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. Security printing paper based on a chipless radio frequency (RF) tag, comprising:
    first base paper;
    second base paper; and
    one or more chipless RF tags disposed between the first base paper and the second base paper; wherein
    at least one layer configured to prevent locations of the chipless RF tags from being exposed to an outside and to enable the security printing paper to be detected, the at least one layer is formed on at least one or more portions of an inner or outer surface of the first base paper and the second base paper, and wherein
    the at least one layer is formed to have a predetermined pattern or color.

2. The security printing paper of claim 1, wherein the layer is formed between the inner surface of the first base paper and the chipless RF tags or on the outer surface of the first base paper.

3. The security printing paper of claim 1, wherein the layer is formed between the inner surface of the second base paper and the chipless RF tags or on the outer surface of the second base paper.

4. The security printing paper of claim 1, wherein, when the chipless RF tags are disposed in two or more sheets of security printing paper, the chipless RF tags are disposed not to overlap each other even when the two or more sheets of security printing paper are superimposed on each other.

5. The security printing paper of claim 1, wherein the chipless RF tags comprise an identification (ID) value configured to enable whether exit of the security printing paper has been permitted to be determined.

6. A method of manufacturing security printing paper based on a chipless RF tag, comprising:

preparing first base paper and second base paper;

forming at least one layer, configured to prevent locations of one or more chipless RF tags from being exposed to an outside and to enable security printing paper to be detected, the at least one layer being formed on at least one or more portions of inner or outer surface of the first base paper and the second base paper;

disposing the chipless RF tags on an inner surface of the first base paper or an inner surface of the second base paper; and combining the first base paper and the second base paper by bonding the first base paper and the second base paper to each other, and wherein the at least one layer is formed to have a predetermined pattern or color.

7. The method of claim 6, further comprising:

forming the at least one layer between the inner surface of the first base paper and the chipless RF tags or on the outer surface of the first base paper.

8. The method of claim 6, further comprising:

forming the at least one layer between the inner surface of the second base paper and the chipless RF tags or on the outer surface of the second base paper.

9. The method of claim 6, further comprising:

disposing the chipless RF tags comprises disposing the chipless RF tags so that the chipless RF tags do not overlap each other even when two or more sheets of security printing paper are superimposed on each other.

10. The method of claim 6, wherein the chipless RF tags comprise an IL) value configured to enable whether exit of the security printing paper has been permitted to be determined.

\* \* \* \* \*